(12) United States Patent
Owechko et al.

(10) Patent No.: US 8,488,877 B1
(45) Date of Patent: Jul. 16, 2013

(54) SYSTEM FOR OBJECT RECOGNITION IN COLORIZED POINT CLOUDS

(75) Inventors: Yuri Owechko, Newbury Park, CA (US); Swarup Medasani, Thousand Oaks, CA (US); Ronald T. Azuma, Santa Monica, CA (US); Jim Nelson, Sumner, WA (US)

(73) Assignee: HRL Laboratories, LLC, Malibu, CA (US)

( * ) Notice: Subject to any disclaimer, the term of this patent is extended or adjusted under 35 U.S.C. 154(b) by 841 days.

(21) Appl. No.: 12/592,836

(22) Filed: Dec. 2, 2009

(51) Int. Cl.
   *G06K 9/00* (2006.01)

(52) U.S. Cl.
   USPC ............ 382/165; 382/103; 382/107; 382/190

(58) Field of Classification Search
   None
   See application file for complete search history.

(56) References Cited

U.S. PATENT DOCUMENTS

| | | | |
|---|---|---|---|
| 7,003,136 B1 * | 2/2006 | Harville ........................ | 382/103 |
| 7,974,461 B2 * | 7/2011 | England et al. ............... | 382/154 |
| 8,179,393 B2 * | 5/2012 | Minear et al. ................. | 345/419 |
| 2006/0182314 A1 * | 8/2006 | England et al. ............... | 382/106 |
| 2006/0193521 A1 * | 8/2006 | England et al. ............... | 382/190 |
| 2009/0190798 A1 * | 7/2009 | Lee et al. ..................... | 382/103 |
| 2011/0181589 A1 * | 7/2011 | Quan et al. .................... | 345/420 |

OTHER PUBLICATIONS

"Structure Verrification tward Object classification using a range camera" Intelligent Autonomous Systems Oct. 2008.*

A. E. Johnson and M. Hebert, "Using Spin Images for Efficient Object Recognition in Cluttered 3D Scenes," IEEE Trans. Pattern Analysis and Machine Intelligence, vol. 21, No. 5, May 1999.

M. Carlberg, P. Gao, G. Chen, and A. Zakhor, "Urban Landscape Classification System Using Airvorne LIDAR," Proceedings of International Conference on Image Processing, 2009.

A. Patterson, P. Mordohai, and K. Daniilidis, "Object Detection from Large-Scale 3D Datasets Using Bottom-up and Top-down Descriptors," Proceedings of European Conference on Computer Vision, 2008.

M. Mahmoudi and G. Sapiro, "Three-Dimensional Point Cloud Recognition via Distributions of Geometric Distances," Proceedings of IEEE Conference on Computer Vision and Pattern Recognition, 2008.

S. Ruiz-Correa, L. G. Shapiro, M. Meila, G. Berson, M. L. Cunningham, and R. W. Sze, "Symbolic Signatures for Deformable Shapes," IEEE Trans. Pattern Analysis and Machine Intelligence, vol. 28, No. 1, Jan. 2006.

* cited by examiner

*Primary Examiner* — Chan S Park
*Assistant Examiner* — Sean Motsinger
(74) *Attorney, Agent, or Firm* — Tope-McKay & Associates

(57) ABSTRACT

Described is a system for object recognition in colorized point clouds. The system includes an implicit geometry engine that is configured to receive three-dimensional (3D) colorized cloud point data regarding a 3D object of interest and to convert the cloud point data into implicit representations. The engine also generates geometric features. A geometric grammar block is included to generate object cues and recognize geometric objects using geometric tokens and grammars based on object taxonomy. A visual attention cueing block is included to generate object cues based on 3D geometric properties. Finally, an object recognition block is included to perform a local search for objects using cues from the cueing block and the geometric grammar block and to classify the 3D object of interest as a particular object upon a classifier reaching a predetermined threshold.

24 Claims, 12 Drawing Sheets

| STATE | CONDITION | ACTION | COMMENTS |
|---|---|---|---|
| 0 | START | FIRST SAMPLE | |
| 1 | POPULATION=0 | NEXT SAMPLE STATE=1 | Sampling resolution is already optimally adjusted for this parser, implicit function, and object |
| 1 | POPULATION>0 | NEXT SAMPLE STATE=2 | |
| 2 | SURROUNDING RING POPULATION=0 | NEXT SAMPLE STATE=3 | E.g. is the populated point surrounded by a torus of air |
| 2 | SURROUNDING RING POPULATION>0 | NEXT SAMPLE STATE=2 | Or not. |
| 3 | SURROUNDING RING POPULATION>0 | QUALIFY POST STATE=4 | E.g. check if feature qualifies dimensionally |
| 3 | SURROUNDING RING POPULATION=0 | NEXT SAMPLE STATE=3 | |
| 4 | COMPLETE | | |

FIG. 5A

SYSTEM FOR OBJECT RECOGNITION IN COLORIZED POINT CLOUDS

GOVERNMENT RIGHTS

This invention was made with Government support under DARPA contract number HM1582-07-C-0017, entitled, "Urban Reasoning and Geospatial Exploitation Technology (URGENT)". The U.S. Government has certain rights in this invention.

FIELD OF INVENTION

The present invention relates to an object recognition system and, more particularly, to a system for object recognition in colorized three-dimensional (3D) point cloud data generated by a fusion of 3D and two-dimensional (2D) imaging sensor data.

BACKGROUND OF INVENTION

The present invention is related to a system for recognizing a large variety of different object types in colorized three-dimensional (3D) point cloud data generated by a fusion of 3D Light Detection and Ranging (LIDAR) and two-dimensional (2D) color imaging sensor data. While nothing heretofore devised recognizes objects using colorized 3D point cloud data by fusing image sensor data, 3D object recognition systems do exist. For example, a 3D object recognition system is produced by Sarnoff Corporation, located at 201 Washington Road, Princeton, N.J. 08540.

Sarnoff's 3D object recognition system utilizes a coarse-to-fine scheme for object indexing and rotationally invariant spin image features for object representation. The recognition process consists of matching input features with a database of object models using locality sensitivity hashing. Such an approach does not work well if the objects exhibit large intra-class variability. Sarnoff's system also does not utilize context since objects are recognized independently, cueing mechanisms are not provided, and exhaustive search must be done in x, y, z, and scale. In addition, spin images require the estimation of normal vectors on a surface mesh enclosing the object. Such vectors are sensitive to noise and are inaccurate if the sampling density is insufficient.

Previous approaches to recognition of objects in 3D point clouds assumed objects are independent of their surroundings. Such prior art systems have not taken advantage of the hierarchical taxonomies of objects and the relationships of objects with the environment.

Thus, a continuing need exists for an object recognition system that recognizes different object types in colorized 3D point cloud data that considers the hierarchical taxonomies of object and the relationships of the objects with the surrounding environment.

SUMMARY OF INVENTION

The present invention relates to a system for object recognition that recognizes different object types in colorized point clouds. The system includes an implicit geometry engine, a geometric grammar block, a visual attention and cueing block, and an object recognition block. The implicit geometry engine is configured to receive three-dimensional (3D) colorized point cloud data regarding a 3D object of interest and to convert the cloud point data into implicit representations based on volume fields. The implicit geometry engine also generates geometric features. The geometric grammar block is configured to generate object cues and recognize geometric objects using geometric tokens and grammars based on object taxonomy. The visual attention cueing block is configured to generate object cues based on two-dimensional (2D) visually salient properties. The object recognition block is configured to perform a local search for objects using cues from the cueing block and the geometric grammar block. Finally, the object recognition block is also configured to classify the 3D object of interest as a particular object upon a classifier reaching a predetermined threshold.

In another aspect, the object recognition block further comprises a search module and a statistical classifier block. The search module is configured to perform a local search for objects using cues from the visual attention cueing block and the geometric grammar block to generate candidate regions of interest (ROIs). The search module is further configured to use particle swarm optimization to perform a local search for objects. Alternatively, the statistical classifier block is configured to, within the candidate ROIs, implement multiple machine learning based object classifiers using geometric features generated by the implicit geometry engine. The statistical classifier block is further configured to classify the 3D object of interest as a particular object upon the output of the object classifiers reaching a predetermined threshold.

In yet another aspect, the implicit geometry engine is further configured to receive the 3D colorized cloud point data and process the 3D colorized cloud point data along separate 2D and 3D pathways, such that in the 3D pathway, the 3D colorized cloud point data is converted into implicit representations based on volume fields, while in the 2D pathway, color information in the 3D colorized cloud point data is projected into 2D representations for cueing and recognition of potential objects.

In another aspect, the object recognition block is further configured to perform several operations, such as performing an object specific search of salient 2D (x, y) locations within the implicit representations to generate candidate ROIs. An object specific search is also performed of salient locations in (x,y) and altitude (z), if required, for the 3D object of interest to generate candidate ROIs. Object classifiers are then applied to classify the 3D object of interest as a particular object upon the output of the object classifiers reaching a predetermined threshold. It is then determined if a spatial search is completed within the implicit representation so that there remains no unsearched portions of the implicit representation. If there are unsearched portions of the implicit representation, then the search parameters are updated with the unsearched portions of the implicit representation and the process is repeated beginning with performing an object specific search. If there are no unsearched portions of the implicit representation, then it is determined if the 3D object of interest is the last object of interest in the implicit representations. If the 3D object of interest is not the last object of interest in the implicit representations, then a next object of interest is selected within the implicit representations and the process above is repeated beginning with performing an object specific search. Alternatively, if the 3D object of interest is the last object of interest in the implicit representations, then the user is provided the classifications of the recognized objects and the procedure is stopped with respect to the 3D object of interest.

The present invention also includes a computer implemented method for object recognition. The method comprising an act of causing a processor to perform the operations described herein. Finally, the present invention also includes a computer program product. The computer program product comprising computer-readable instruction means stored on a computer-readable medium that are executable by a computer having a processor for causing the processor to perform the said operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is an action table with possible states that are determined by the values of geometric tokens based on point populations in a torus-shaped region of interest (ROI) volume;

DETAILED DESCRIPTION

Figure 1:
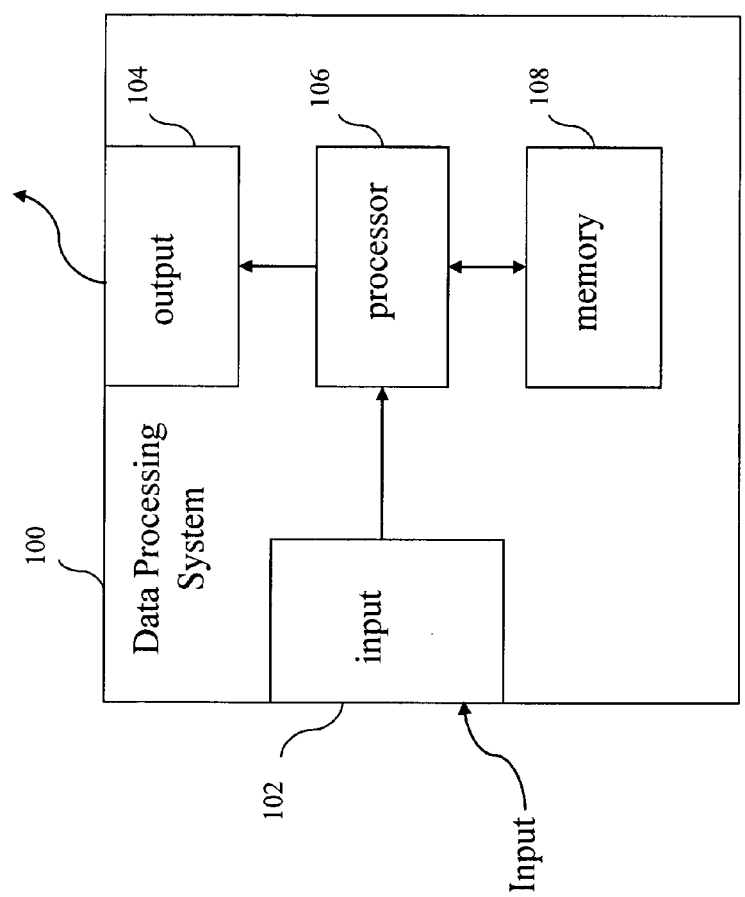
FIG. 1 is a block diagram depicting the components of an object recognition system of the present invention.

The present invention relates to an object recognition system and, more particularly, to a system for object recognition in colorized three-dimensional (3D) point cloud data generated by a fusion of 3D Light Detection and Ranging (LIDAR) and two-dimensional (2D) color imaging sensor data. The colors from the fused point cloud data are used in the 2D object recognition pathway. In the 2D pathway, color information in the 3D colorized cloud point data is projected into 2D representations for cueing and recognition of potential objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Finally, details of the present invention are provided to give an understanding of the specific aspects.

(1) Principal Aspects

The present invention has three "principal" aspects. The first is a system for object recognition in colorized three-dimensional (3D) point cloud data generated by a fusion of 3D Light Detection and Ranging (LIDAR) and two-dimensional (2D) color imaging sensor data. The system is typically in the form of a computer system (having one or more processors) operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a system of the present invention is provided in FIG. 1. The system 100 comprises an input 102 for receiving information from at least one sensor for use in recognizing an object in a scene. Note that the input 102 may include multiple "ports." Typically, input is received from at least one sensor, non-limiting examples of which include video image sensors and light detection and ranging (LIDAR) sensors. An output 104 is connected with the processor for providing information regarding the presence and/or identity of object(s) in the scene to a user or to other systems in order that a network of computer systems may serve as an object recognition system.

Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
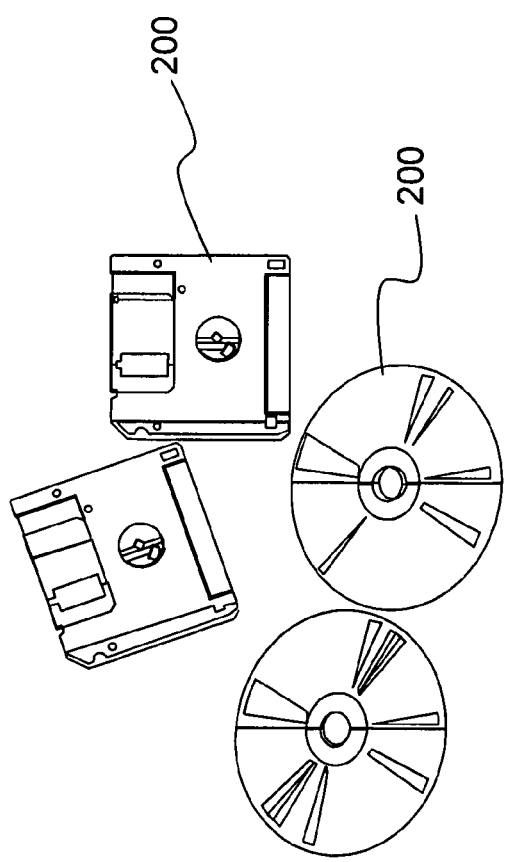
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) Introduction

The present invention is related to a system for recognizing a large variety of different object types in colorized three-dimensional (3D) point cloud data generated by a fusion of 3D Light Detection and Ranging (LIDAR) and two-dimensional (2D) color imaging sensor data. The colors from the fused point cloud data are used in the 2D object recognition pathway. In the 2D pathway, color information in the 3D colorized cloud point data is projected into 2D representations for cueing and recognition of potential objects. Colorized point clouds are a set of points in 3D space, each of which represents the location and color of a point on a surface in a 3D real-world scene. The points may be irregularly arranged in 3D space. Colorized point cloud data consist of files which list the (x, y, z) spatial coordinates of points along with the reflectivity and/or RGB (red, green, blue) values associated with each point. Colorized point cloud data can now be routinely collected for large urban scenes using both ground-based and airborne LIDAR sensor platforms. The present invention is a novel system for automatically recognizing objects such as cars, buildings, trees, windows, etc. in 3D point cloud data.

The present invention includes the combination of:
a. Incorporating the relationships between objects (object taxonomy) in a data-driven "just-in-time" processing flow for context-based recognition of hierarchical objects;
b. Grammar-based cueing and recognition of geometric objects using implicit geometry representations of the 3D data and geometric token-based finite state machines;
c. Area delimitation and 2D saliency recognition using bio-inspired bottom-up visual attention and gist mechanisms;
d. Statistical 3D object classifiers based on machine learning of geometric token feature vectors
e. 2D and 3D object statistical object classifiers based on convolutional neural networks and prelearning of a set of relevant object features from unlabeled data that are shared by multiple objects;
f. Fast local search using cognitive swarm optimization methods;
g. Feedback between bottom-up cueing and top-down recognition modules for maximizing recognition rates and minimizing error rates; and
h. Executive layer for handling input and output, visualization, construction of the scene map, coordination of recognition processes according to the object taxonomy, and context-based recognition and false alarm rejection.

The present invention improves upon the prior art by using a system-level approach that recognizes objects by incorporating environmental and taxonomic contexts. The complexity scaling of the system is sublinear in the number of objects that can be recognized, which is very important when a large number of objects must be recognized. The scaling of the system is described as sub-linear since objects are represented by parts and the parts are arranged in a tree structured hierarchy. This allows for the detection of objects at log M where M is the height of the taxonomy, which is typically quite less than N the number of classes.

Figure 3:
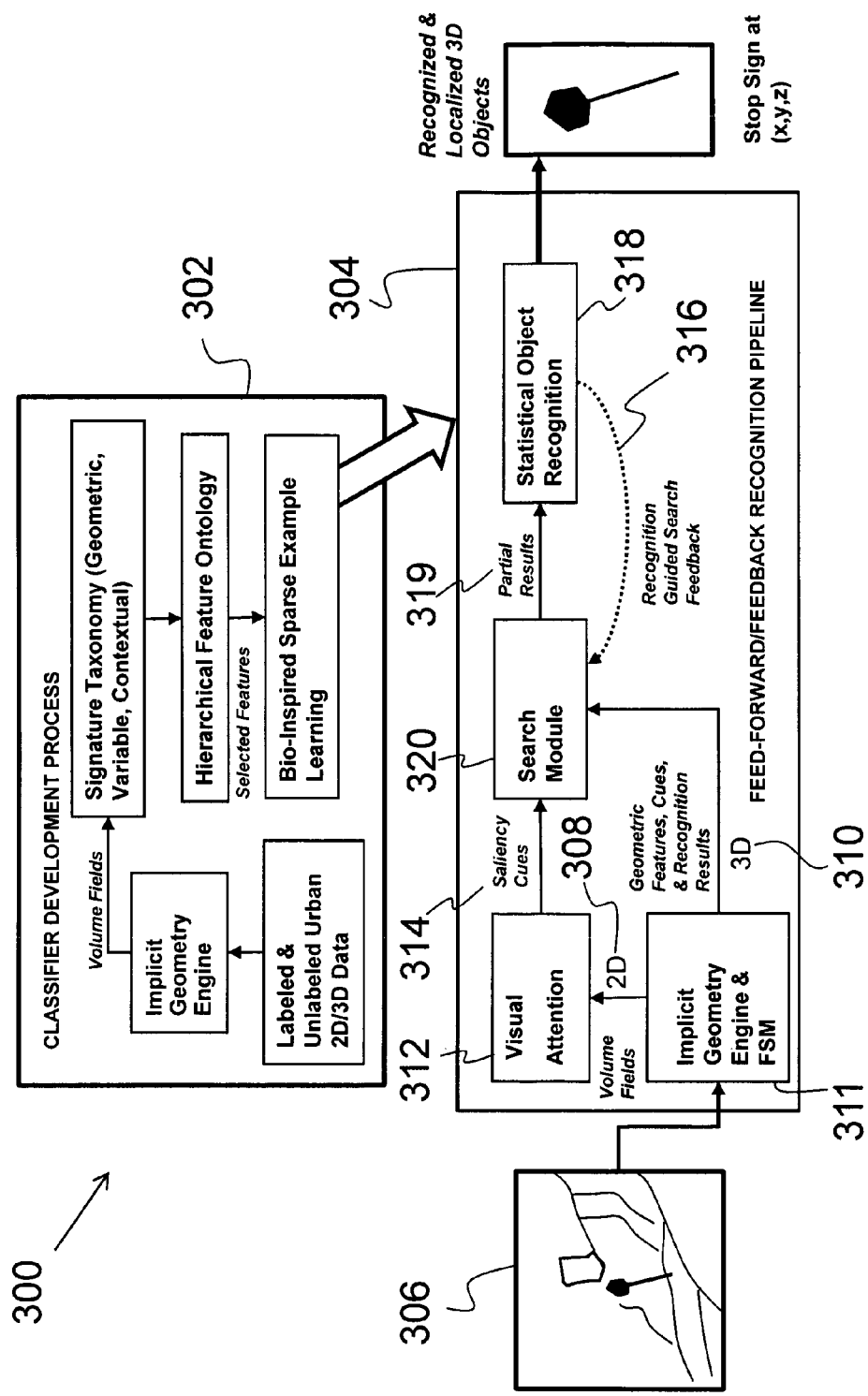
FIG. 3 is a block diagram of a three-dimensional (3D) object recognition system according to the present invention.

The present invention is applicable to programs that utilize 3D point cloud data generated by LIDAR, time-of-flight imagers, laser scanners, stereo imagers, or other sensors for sensing and automated understanding of 3D environments. For example, future commercial vehicles may use LIDAR to enable autonomous driving modes, as was demonstrated in the Defense Advanced Research Projects Agency's (DARPA's) Grand Challenge autonomous urban navigation competition. The present invention could be used to allow computers to recognize hundreds of different objects and build up a model for the scene automatically, thereby enabling much more complex autonomous behavior than is currently possible. The system could also be used to automatically monitor and track objects in factories in order to maximize safety and efficiency. In another aspect, the system can be used for robotic vision applications in factory assembly lines or in other applications that need intelligent 3D sensing systems (3) Details of the Invention A block diagram of the 3D object recognition system 300 is shown in FIG. 3. The system consists of two main subsystems (1) an offline object classifier development process 302 and an online object recognition pipeline 304 that implements the object classifiers. The present invention is directed to the online object recognition pipeline 304, which is provided as a general overview in FIG. 3. The colorized 3D point cloud data 306 is processed along separate 2D and 3D pathways, 308 and 310, respectively.

In the 3D data pathway 310, recognition of objects is performed after converting the point cloud data 306 into an implicit geometry representation based on volume fields (such as population or distance functions). The 3D pathway includes an implicit geometry engine 311 that is configured to receive the 3D colorized point cloud data regarding a 3D object of interest and to convert the cloud point data into the implicit representations based on volume fields. The implicit geometry engine 311 also generates geometric features. An implicit representation of the data greatly improves the flexibility and efficiency of subsequent processing steps and forms the basis for syntactic or grammar-based recognition of geometric objects.

In the 2D pathway 308, color or range information is projected into 2D representations for saliency processing and cueing of potential objects.

Both 2D and 3D data are processed using multiple object classifiers for different object signature types. A feedback loop 316 from the 3D statistical classifier block 318 to the area-delimitation/classifier-selection module is implemented using a search module 320 that utilizes an optimization algorithm. As a non-limiting example, the search module uses a Particle Swarm Optimization algorithm. The swarm search process is controlled using bio-inspired attention and saliency cues 314 as well as feedback 316 from partial object recognition results 319. This attention mechanism helps to guide the search and reduces the search space further for fast detection of objects. Cognitive swarms can also search in additional dimensions besides the scene coordinates. For example, the cognitive swarm can also search in orientation angle or scale.

Figure 4:
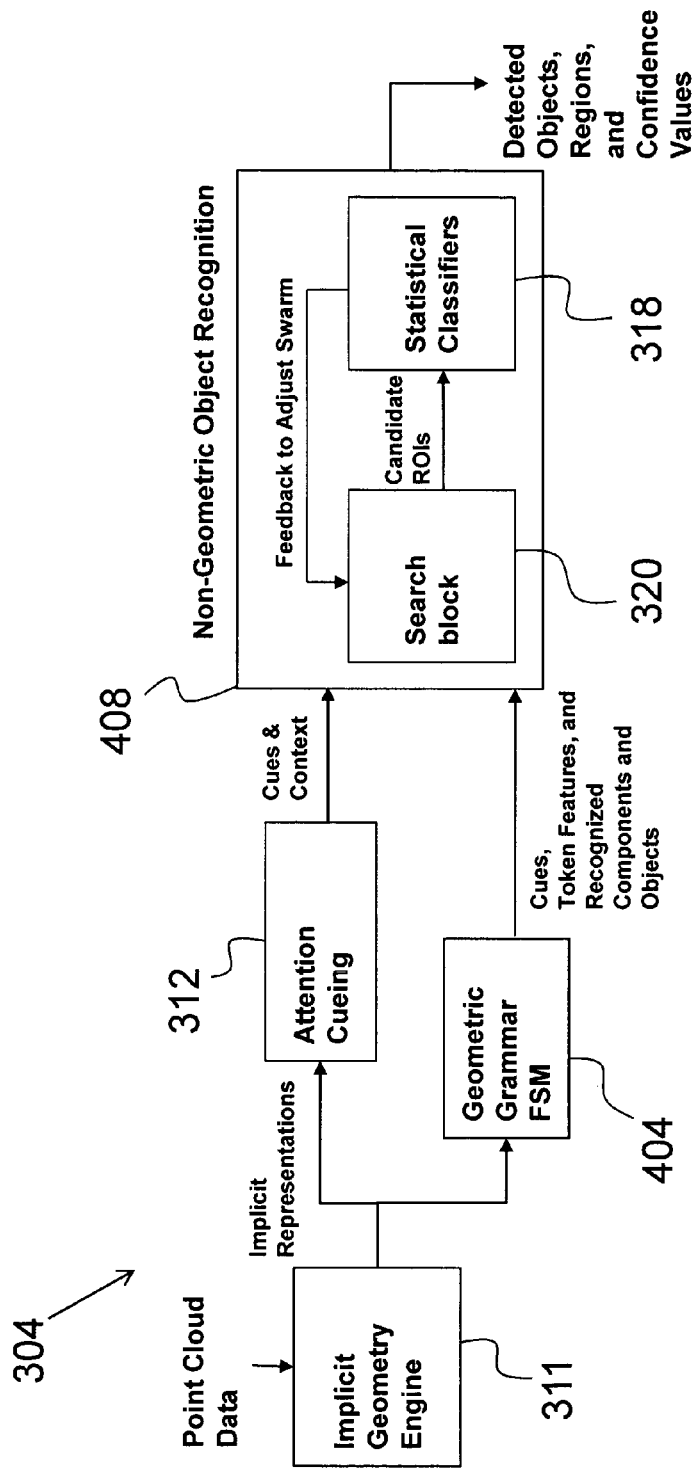
FIG. 4 is an illustration of an object recognition subsystem.

FIG. 4 illustrates a more detailed view of the online object recognition pipeline (i.e., element 304 of FIG. 3). As shown in FIG. 4, the object recognition pipeline 304 includes several processing blocks. As noted above, an implicit geometry engine 311 is included which converts the input 3D point cloud data into implicit representations based on volume fields. Further details of the implicit geometry engine 311 are provided below.

Figure 5B:
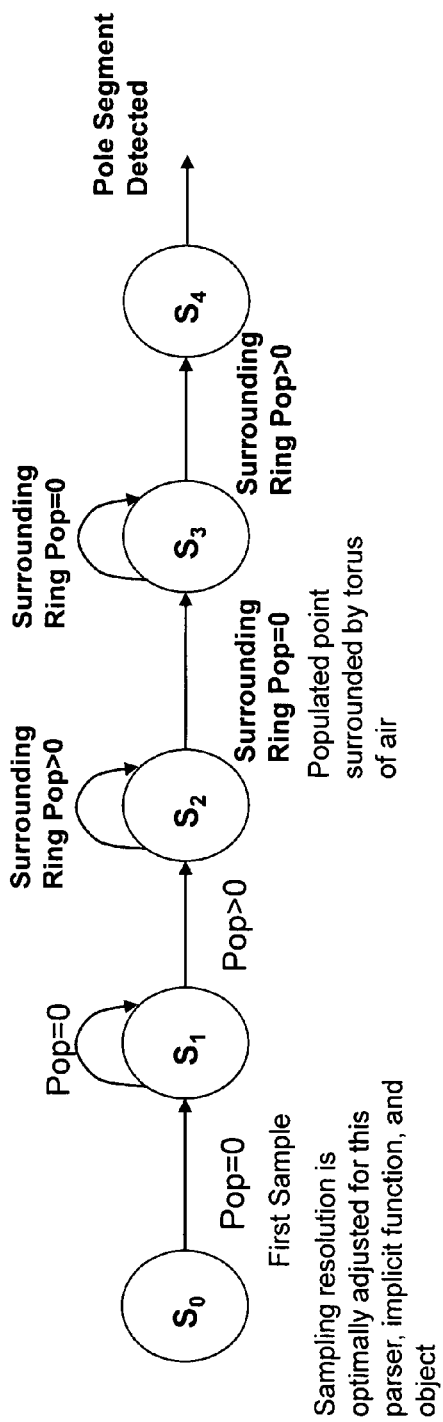
FIG. 5B is a graphical representation of a Finite State Machine.
Figures 5C, 5D, 5E:
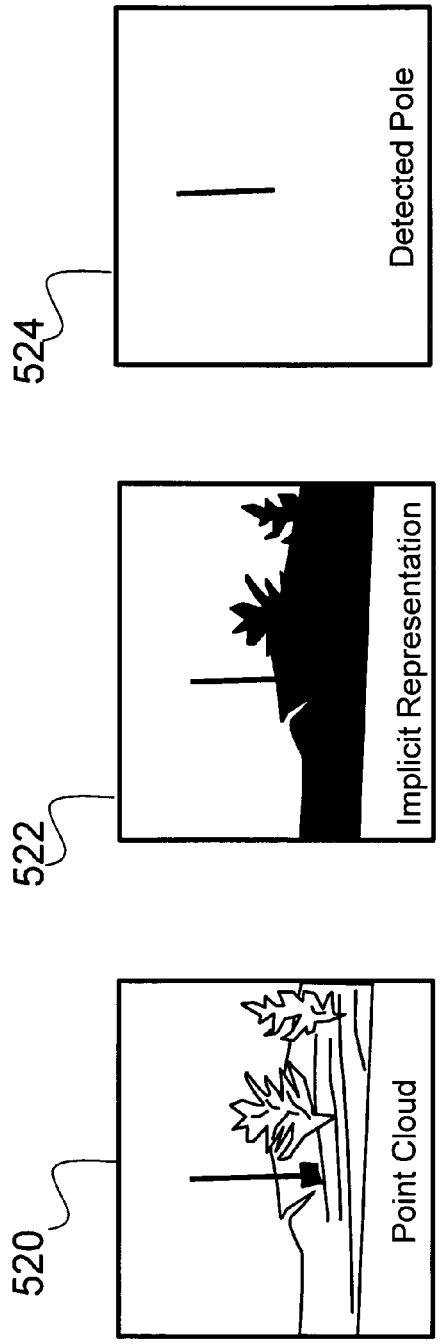
FIG. 5C is an illustration of input point cloud.
FIG. 5D is an illustration of an implicit representation using population function.
FIG. 5E is an illustration of a detected pole object.

Also included is a geometric grammar block 404 which generates object cues and recognizes geometric objects using geometric tokens and grammars based on object taxonomy implemented using finite state machines (FSM). The geometric grammar block 404 uses an FSM to detect a variety of cues and objects such as poles, walls, etc. A FSM is computer code that performs an action and changes its state based on a set of rules that take as inputs the current state of the FSM and the result of a condition test. For example, for pole detection, the condition test (i.e., ring test) is measuring the number of points within the volume defined by a ring or torus, such that the inside is occupied and surrounded by a torus of air. The rule table in FIG. 5A shows which actions are taken depending on the state and condition test. For example, if the ring population is 0 and the state is 1, then the state doesn't change and another sample is taken. When another sample is taken, the test is redone by moving to the next location and redoing the ring test using the same ring parameters. A population of zero means that there are no points in the area. If the population is not 0, then the state changes and the ring starts climbing up the pole until it finds the top. For a pole, a torus is scanned along the z-axis to ascertain that a pole-like object of a certain height exists. For detecting walls, a different kernel (not a torus) is used that looks for empty space on both sides of an occupied location. If the pole-like object of a certain height exists, it then qualifies or labels the object as a pole and then goes on to find other poles. This sequence of events is illustrated graphically in FIG. 5B. The results of the pole detection and segmentation are shown in FIGS. 5C to 5E.

Referring again to FIG. 4, a visual attention cueing block 312 is included that generates object cues based on bio-inspired models of visual saliency. Further details of the visual attention cueing block 312 are provided below.

An object recognition block 408 is included that is configured to perform a local search for objects using cues from the cueing block 312 and the geometric grammar block 404. Finally, the object recognition block 408 classifies the 3D object of interest as a particular object upon a classifier reaching a predetermined threshold, such as a value between 1 and 100, where 100 is an absolute certainty that the object of interest is the particular object and 1 is the absolute certainty that the object of interest is not the particular object (or vice versa).

The object recognition block 408 includes a search module 320 and a statistical classifier block 318. The search module 320 is configured to perform a local search for objects using cues from the visual attention cueing block 312 and the geometric grammar block 404 to generate candidate regions of interest (ROIs). The search module 320 can be implemented using a variety of search tools. As a non-limiting example, a cognitive swarm can be used which performs an intelligent local search for objects using swarm optimization of statistical object classifier confidence levels and cues from the cueing block and geometric grammar blocks.

The statistical classifier block 318 is configured to, within the candidate ROIs, implement multiple machine learning based object classifiers using geometric features generated by the implicit geometry engine 311 as well as other features from both labeled and unlabeled 3D data. These geometric features are based on tokens that are detected in the ROI. Different kinds of tokens are marked while parsing the dataset. Examples of tokens are "column above current sample is empty," "the ROI on either sides of the current sample is not occupied," etc. The geometric features capture volumetric and surface based sizes, ratios, and contiguity on an axially z-oriented cylindrical ROI. The statistical classifier block 318 is further configured to classify the 3D object of interest as a particular object upon the output of the object classifiers reaching a predetermined threshold.

The search module 320 and the statistical classifier block 318 work together in a feedback loop. The classifier confidence value for the current location of the swarm particles determines the gbest location which is in turn used to intelligently move the particles for the next iteration. The feedback information is used to iteratively focus onto the object of interest. The feedback loop allows the blocks 320 and 318 to efficiently recognize and localize non-geometric objects that have too much intra-class variability for reliable syntactic recognition using geometric grammars. For example, unlike poles and walls, objects such as grass, etc, do not have a rigid geometric structure which can be described using simple rules. In such cases, the grammar based approach will not be successful.

An executive layer block can be included which coordinates the other blocks and performs support functions such as reading in data, building a scene map or model of the processed data, context-based recognition and false alarm rejection, providing visualization options, and tabulating recognition results into standard output formats. It should be understood by one skilled in the art that although this block is not illustrated, it is assumed to exist or can be easily generated as understood by one skilled in the art.

(3.1) Implicit Geometry Engine

The present invention includes an implicit geometry engine 311 which performs two vital functions. First, the implicit geometry engine recasts the irregularly sampled 3D point cloud data into an efficient, noise-tolerant, and robust volume field data representation (i.e., the implicit representations) with well-defined spatial sampling and variable resolution. Implicit representations have several advantages over explicit representations that typically use surface meshes which are typically slow to generate and suffer from proximal ambiguity. The implicit geometry engine creates efficient LIDAR data representations for fast clutter rejection, ground plane detection, geometric and contextual object recognition, and fast downstream processing by the other modules. Volume field representations allow spatially varying re-sampling of the data which greatly reduces the computational load while maintaining sufficient accuracy for object recognition. In addition, the implicit representation simplifies geometric reasoning about objects for clutter rejection, ground plane detection, recognition of well-defined geometric objects, and generation of constraints for the search process based on contextual information. Further, the implicit representation enables downstream operations such as area delimitation and object recognition to be more efficient and robust. Second, the implicit geometry engine implements geometric and context-based reasoning for object cueing and recognition using syntactic grammar-based reasoning that is implemented using finite state machines. Implicit geometry representations resolve scaling and accelerability bottlenecks associated with explicit point or surface geometry modeling representations. Since advanced 3D sensors are capable of digitizing as much as a gigapoint (i.e., one billion points) for a local scene, processing steps which scale with the number of raw data points (N) or higher must be minimized, parallelized, or eliminated. Processing times for steps such as mesh generation or sorting points scale with N log(N) are examples of explicit processing steps which quickly become intractable for large numbers of points. By re-expressing the raw data points as a scalar volume field function evaluated at a number (M<<N) of user specified sampling points (usually on a uniform grid), subsequent operations can be arbitrarily more tractable using implicit geometry. The user of the data can select and reselect alternative regions of interest and spatial sampling resolutions depending on the requirements of each processing step. A non-limiting example of a suitable field function is the "population function," which can be computed using the Fast Marching Method (scales with N but is fully parallelizable). The Fast Marching Method is a method as described by Sethian, in "A Fast Marching Level Set Method for Monotonically Advancing Fronts," Sethian, J. A., Proc. Nat. Acad. Sci., 93, 4, pp. 1591-1595, 1996, which is incorporated by reference as though fully set forth herein.

Several key benefits of implicit geometry representations for 3D object recognition are summarized below:
  a. Systematic method for integrating 3D data;
  b. Reliable comparison and change detection even when point data are different;
  c. Position uncertainty can be explicitly modeled within system;
  d. Smoothly varying functions and surfaces support differential operations;
  e. Points can be added incrementally, dynamically, and in parallel;
  f. Variable sampling density provides load dependent and dynamically tunable throughput; and
  g. Geometry information can be sampled and distributed at different resolutions in parallel The implicit geometry engine 311 also recognizes "geometric" objects that have low intra-class variability using finite state machines and token-based grammars. As a non-limiting example, the population function can be used as the implicit representation. In this form, the given point cloud is first divided into cells based on a desired resolution. The points in the dataset that fall into each of the cells are then counted together to result in a 3D population function. Non-zero values for a cell indicate that points fall into that cell. This implicit representation can then be parsed to generate tokens, geometric features, etc.

For further understanding, FIGS. 5A through 5E illustrate using an example finite state machine (FSM) and grammar to select pole-like objects and processing results for 3D LIDAR data. A FSM is computer code that performs an action and changes its state based on a set of rules or grammar that take as inputs the current state of the FSM and the result of a condition test. As briefly mentioned above, FIG. 5A is an action or rule table 500 with possible states that are determined by the values of geometric tokens based on point populations in a torus-shaped region of interest (ROI) volume. The action table 500 shows an example grammar for recognition of pole-like features of local geometry. The action shows which actions are taken depending on the state and condition test. For example, if the ring population is 0 and the state is 1, then the state doesn't change and another sample is taken. If the population is not 0, then the state changes and the ring starts climbing up the pole until it finds the top. It then qualifies or labels the object as a pole and then goes on to find other poles.

FIG. 5B is a graphical representation of a Finite State Machine implementing the action table of FIG. 5A. FIG. 5B illustrates the sequence of events for pole detection graphically as a set of state transitions over time. The results of the pole detection and segmentation are shown in FIGS. 5C to 5E.

FIG. 5C is an illustration of input point cloud 520. The input point cloud 520 is used by the implicit geometry engine to generate the implicit representation 522, as shown in FIG. 5D. The implicit representation 522 is generated using a population function. Finally, FIG. 5E is an illustration of a detected pole object using the present invention.

(3.2) Visual Attention Cueing Block 312

The visual attention cueing block efficiently directs computational resources towards potentially interesting locations which may contain objects of interest. Cueing acts as a pre-screening mechanism, not only accelerating search for objects, but also by reducing false positive rates. This is achieved through an extension of the model developed by Itti et al. in "Modeling the Influence of task on attention," *Vision Research*, vol. 45, pp. 205-231, 2005.

In short, the model analyzes the entire scene very rapidly along a number of low-level visual features that closely approach the response tuning properties of neurons in early visual cortical areas of the primate brain. Competition for representation in each of these feature channels gives rise to a selection of those locations which statistically stand out from their neighbors. In its basic form, the model is purely bottom-up; that is, it is attracted to locations which would also grab the attention of a casual human observer (this has been extensively validated using human and monkey eye-tracking studies). However, the model can also be used top-down when a specific behavioral goal or target of interest is desired. A natural mechanism for incorporating the saliency cues generated by the cueing block in the search process is to preferentially initialize the cognitive swarm in 3D salient regions that are designated by projecting the 2D salient regions into the 3D data. This increases the probability that a relevant object will be detected quickly. As described below, the swarm particles move in a multidimensional solution space. A 3D subspace represents the spatial coordinates in the point cloud data. Additional dimensions can represent other parameters to be optimized, such as classifier type, object rotation angle, etc.

(3.3) Object Recognition Block 408

Figure 6:
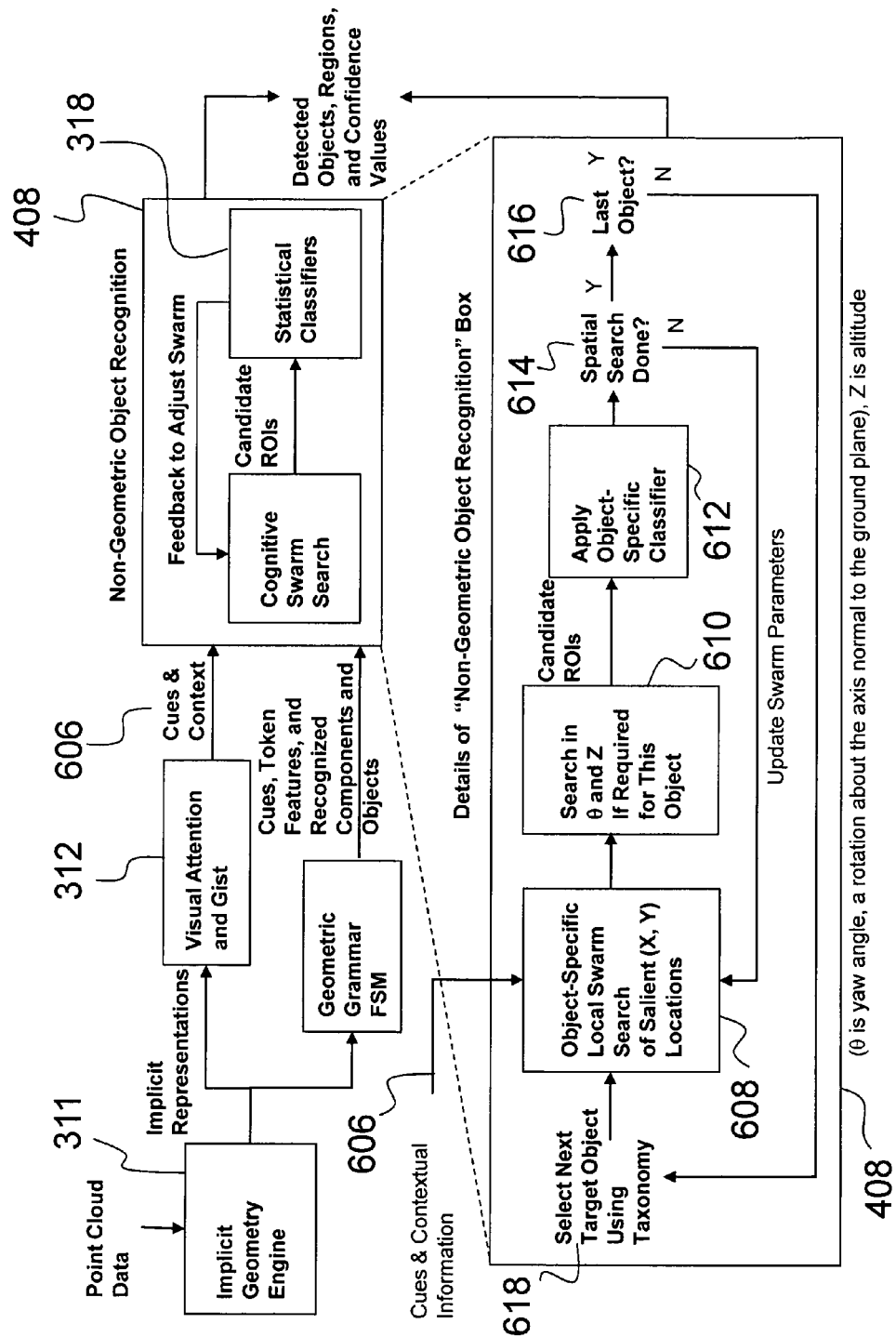
FIG. 6 is a block diagram illustrating non-geometric object recognition processing.

Details of the non-geometric object recognition block 408 are shown in FIG. 6. The object recognition block 408 uses a smart search mechanism to locate objects by maximizing the confidence of statistical object classifiers. The smart search mechanism is any suitable mechanism operable for searching a domain (e.g., image or implicit representation), a non-limiting example of which includes cognitive swarms. The cognitive swarm is cued by both the implicit geometry engine 311 and the cueing block 312 to search in local regions that are likely to contain objects. For example, the cueing block 312 could find all the regions that have long horizontal edges but only some of them might correspond to regions that have buildings. The cueing block 312 then provides all regions with horizontal edges as input to the object recognition block 408. The object recognition block 408 then sub-selects from the cues 606 and determines the locations of all the buildings.

The cues 606 are based both on saliency measures and on previous object detection results that provide context for the current object search. Details of the cognitive swarm search mechanism have been described in U.S. patent application Ser. No. 10/918,336, entitled, "Object Recognition System Incorporating Swarming Domain Classifiers", and filed Aug. 14, 2004, which is incorporated by reference as though fully set forth herein.

After receiving the cues 606, the object recognition block 408 performs an object specific search of salient two-dimensional (2D) 608 (x, y) locations within the implicit representations to generate candidate ROIs. Further, if required for the 3D object of interest, the system performs an object specific search of salient 3D 610 locations in (x,y) and altitude (z) to generate candidate ROIs. For example, if there are items of varying height, such as pole-like objects and traffic lights, the object specific search of salient 3D 610 locations in a selected altitude (z) can be used to separate the pole-like objects from the traffic lights and generate the applicable candidate ROIs. Object specific classifiers (using the statistical classifier block 318) are then applied 612 to classify the 3D object of interest as a particular object upon the output of the object classifiers reaching a predetermined threshold. The object recognition block 408 then determines if the spatial search is completed 614 within the implicit representation so that there remains no unsearched portions of the implicit representation. If the spatial search IS completed, then the object recognition block 408 determines if the 3D object of interest is the last object of interest 616 in the implicit representations (Alternatively, IF the spatial search IS NOT completed, then updating search parameters with the unsearched portions of the implicit representation and repeating the process above beginning with performing an object specific search 608). IF the 3D object of interest IS the last object of interest, then the user is provided the classification of the recognized objects. Alternatively, IF the 3D object of interest is NOT the last object of interest, then selecting a next object of interest 618 within the implicit representations and repeating the process above beginning with performing an object specific search 608. It should be understood that for 3D objects of interest, the candidate ROIs are generated as the output of block 610, which performs the object specific search of salient 3D locations.

(3.4) Statistical Classifier Block 318

Figure 7:
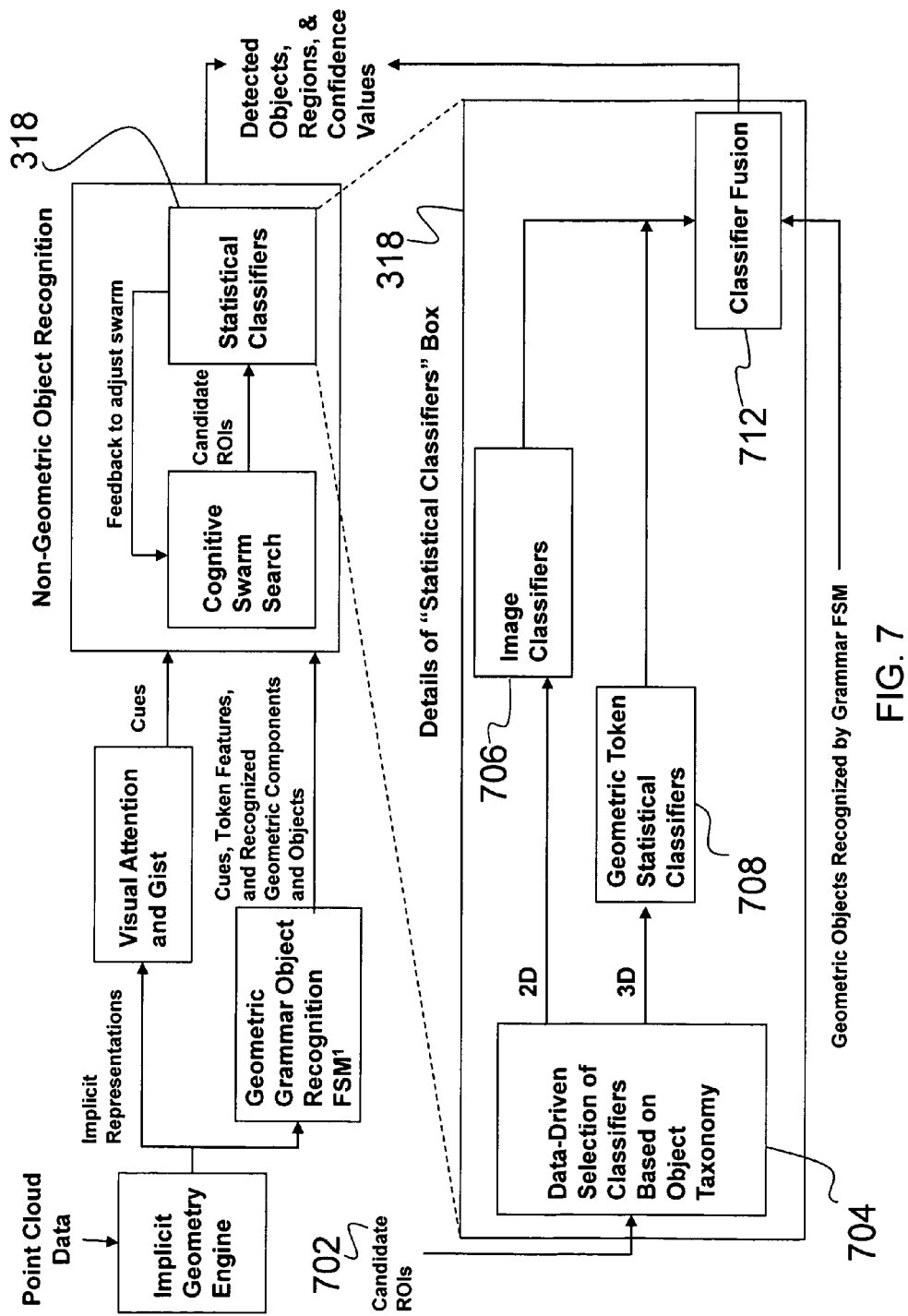
FIG. 7 is a block diagram illustrating a detailed view of the statistical object classification portion of the non-geometric object recognition process illustrated in FIG. 6.

Details of the statistical classifier block 318 are shown in FIG. 7. The statistical classifier block 318 implements multiple types of object classifiers and fuses the results. Generally speaking, the statistical classifier block 318 is configured to, within the candidate ROIs 702, implement multiple machine learning based object classifiers using geometric features generated by the implicit geometry engine. The statistical classifier block is also configured to classify the 3D object of interest as a particular object upon the output of the object classifiers reaching a predetermined threshold.

The appropriate classifier for the current object search are selected 704 based on previous recognition results, cues, and the relationships between objects and their components as expressed in an object taxonomy. The classifiers include 2D image classifiers 706 and 3D geometric token classifiers 708. The classification results are then fused through classifier fusion 712.

(3.5) Taxonomy

Figure 8:
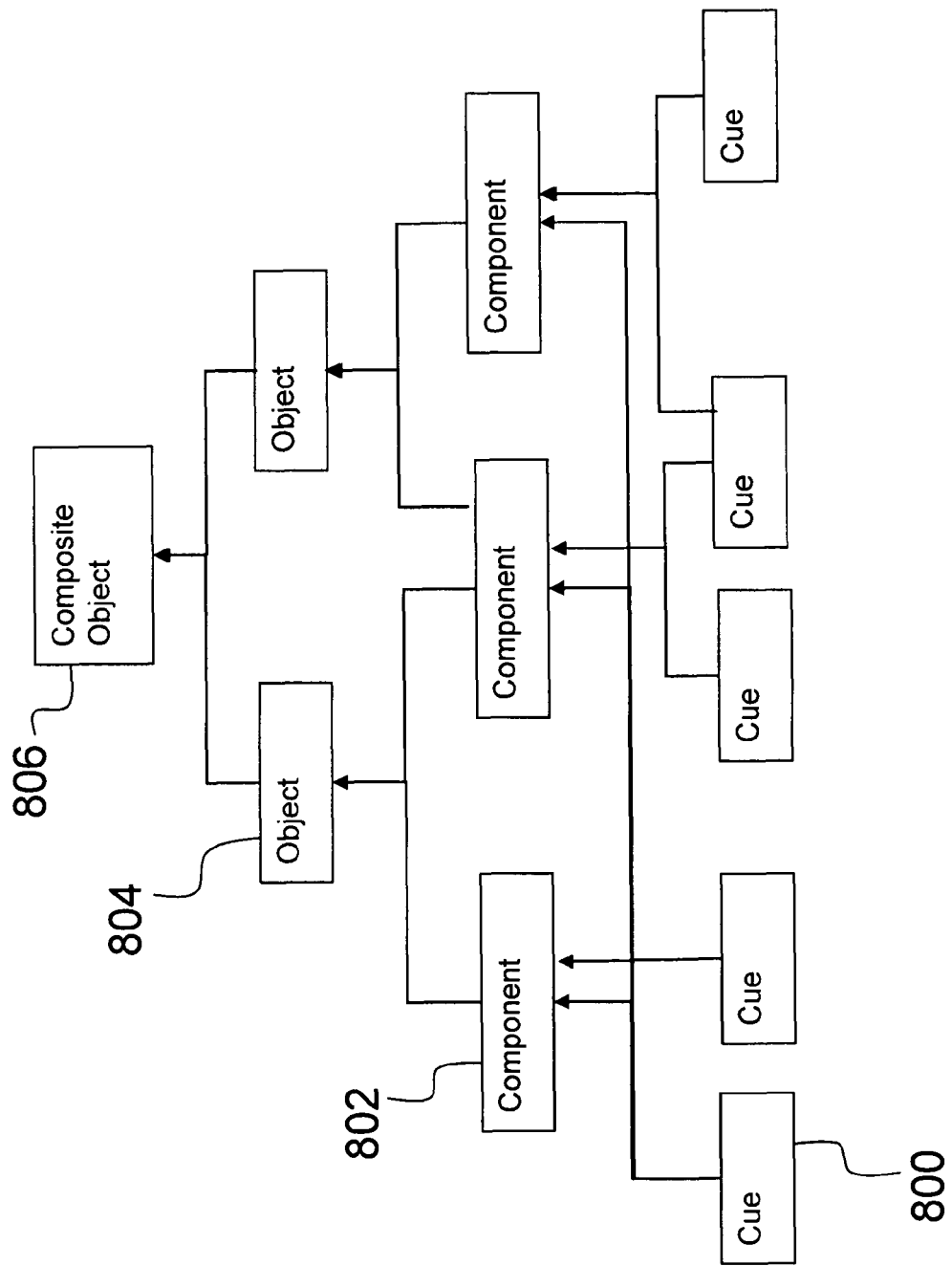
FIG. 8 is an illustration of taxonomy of hierarchical object recognition in the bottom-up processing flow.
Figure 9:
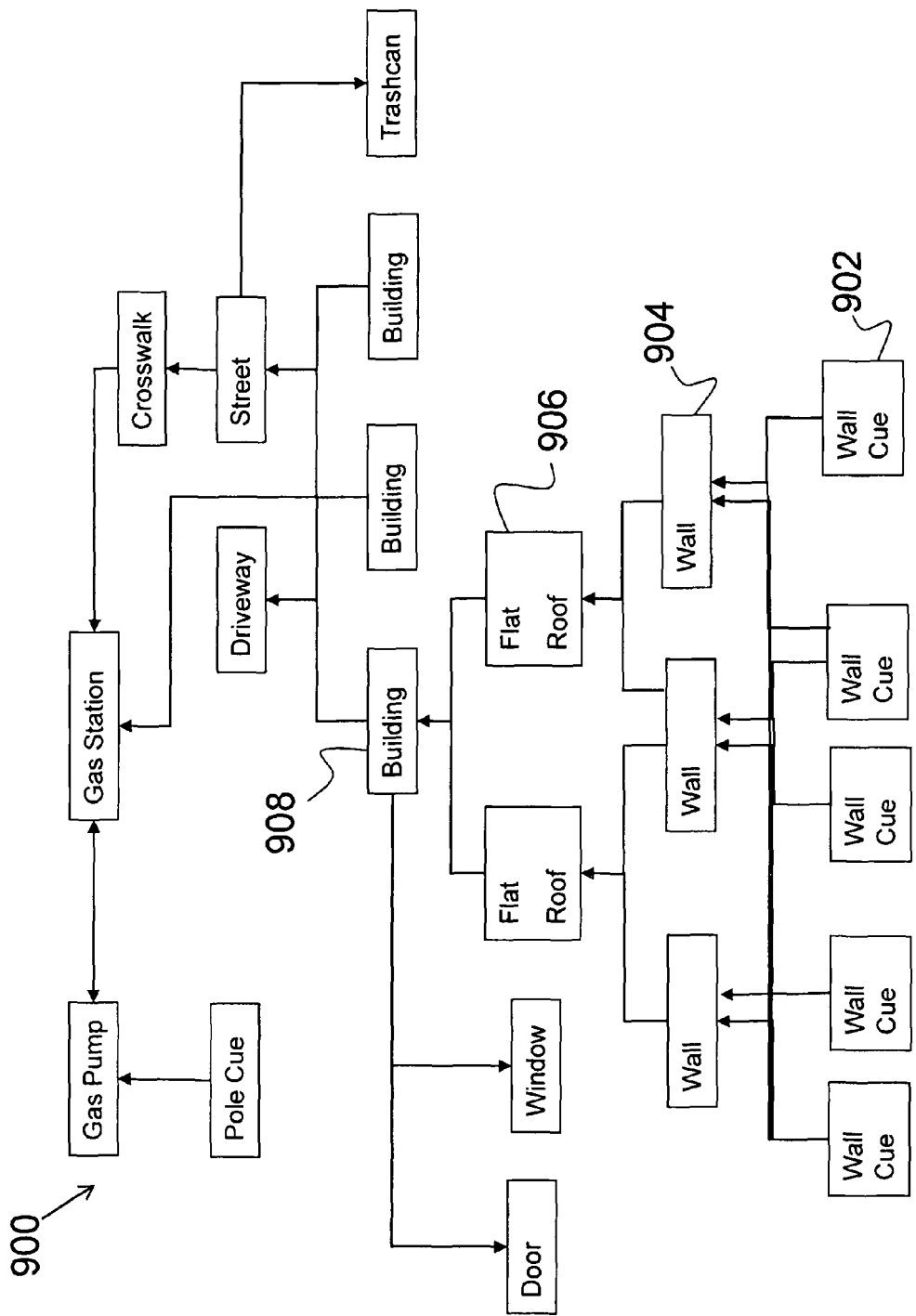
FIG. 9 is an illustration of bottom-up and top-down recognition showing how a composite object (e.g., gas station) is recognized from other lower level objects (e.g., building, street, crosswalk, gas pump) and how a lower level object (e.g., door, window) can also be recognized from a higher level object (e.g., building).

A critical aspect of effective recognition systems for large numbers of objects is an object representation scheme that encodes the relationships between objects. As shown in FIG. 8, the present invention uses a hierarchical representation or taxonomy for objects that includes cues 800, components 802, objects 804, and complex or composite objects 806. An example of the taxonomy used in the current application is shown in FIG. 9. In general, objects are recognized by first detecting their constituent parts. This allows classifiers to be executed in a hierarchical fashion. This representation is a type of representation by parts. Referring again to FIG. 8, taxonomy here refers to relationships between objects 804 and component 802 parts that are common across multiple object classes. Typical components 802, such as cylinders, planes, etc., occur more frequently as parts of larger complex objects 806, have fewer variations, and can be detected more robustly. Successful detection of components 802 in turn allows robust detection of complex objects 806 and also enables compact representation. Furthermore, sharing components 802 across classes allows the computational complexity of learning and recognition to be sub-linear in the number of object classes. The taxonomy also incorporates the grouping of objects 804 into subgroups based on the expected nature of their classification signature. Non-limiting examples of such classification signatures include: 3D geometric, for grammar-based recognition; 3D variable, for learning-based 3D recognition; 2D photometric, for learning-based 2D recognition; and contextual, for classification that takes advantage of contextual information and recognition of other objects in the neighborhood. These subgroups are not disjoint; more than one signature type may be used to recognize a particular object. The taxonomy can be used to generate sparse processing trees for large object sets which removes the need to run a large number of different classifiers in order to recognize an object. For example, the present invention uses common classifiers to detect the parts and then uses the detected parts to flow down the taxonomy and detect the many objects present in the scene in sub-linear time.

The movement of the FSM through the point cloud, its state changes, and associated actions are data-dependent. The FSM processes just what is needed and just in time, consuming the point cloud data "pac-man-like". The Java or C++FSM is generated using ANTLR from user-specified rules that describe a grammar that recognizes objects as strings of valid token sequences. The object taxonomy is embedded in the grammar.

If considering object features and components to be tokens in a grammar defined by the object taxonomy or semantic tree, then objects are the valid sentences recognized by the grammar. A recognition finite state machine (FSM) can be created to parse the sequence of tokens generated as the FSM traverses the implicit representations and semantic tree. The FSM can generate actions such as geometric or variable object recognition and the range of actions can include requests for directed swarm search. The action will be executed in a data-dependent manner that avoids unnecessary processing. The processing flow of the present invention incorporates a FSM that will select actions, such as selecting the next classifier, spatial search increment, and resolution setting based on the current position of the FSM in the taxonomy tree. This approach incorporates contextual knowledge and avoids a combinatorial explosion in the number of classifier evaluations that must be performed at each spatial location. An example of bottom-up and top-down traversal of the taxonomy tree 900 is shown in FIG. 9. As shown in FIG. 9, the various cues 902, components 904, and objects 906 result in the complex or composite object 908.

Figure 10:
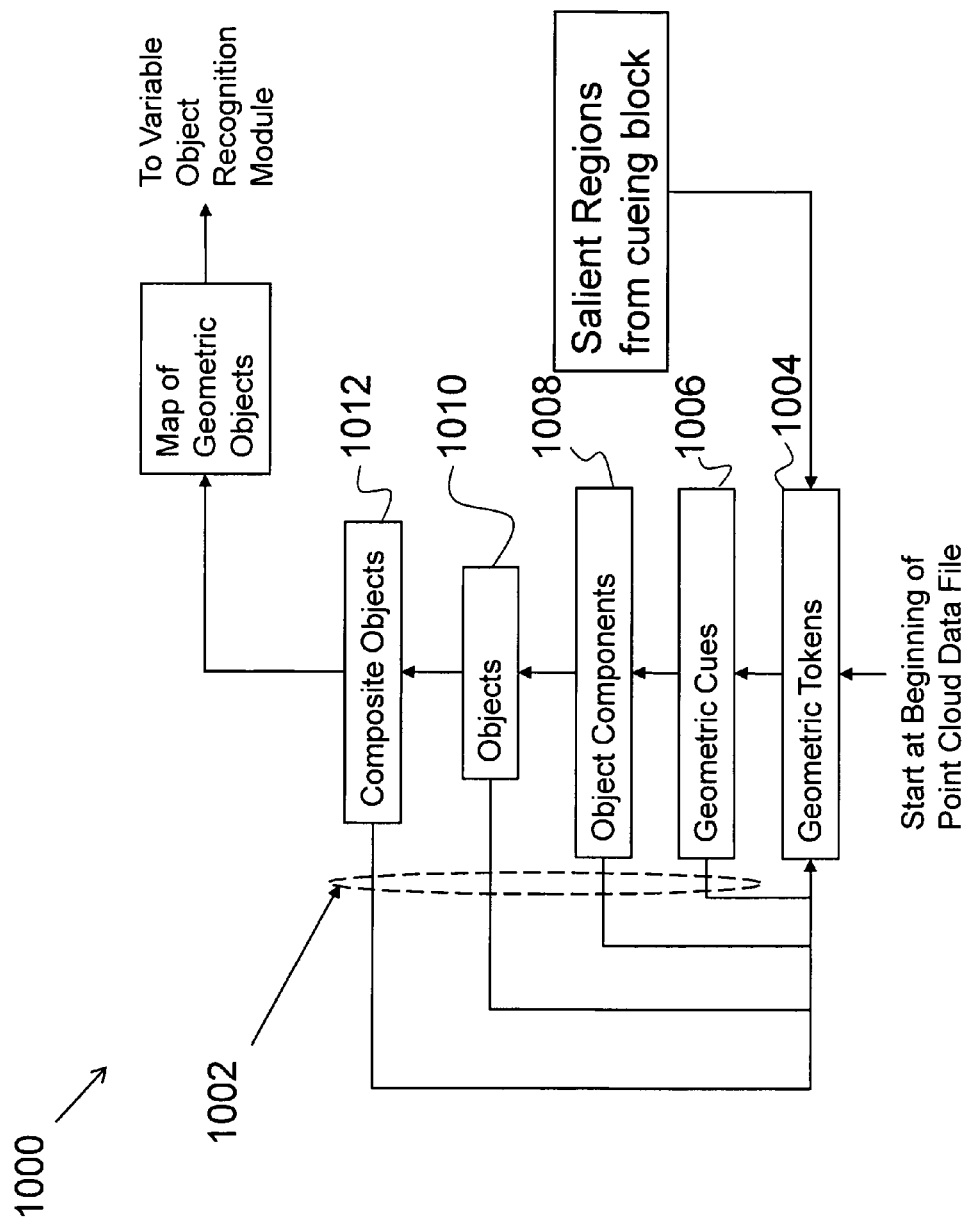
FIG. 10 is an illustration of the processing flow for geometric object recognition using grammars implemented by finite state machines and state transitions based on geometric tokens.
Figure 11:
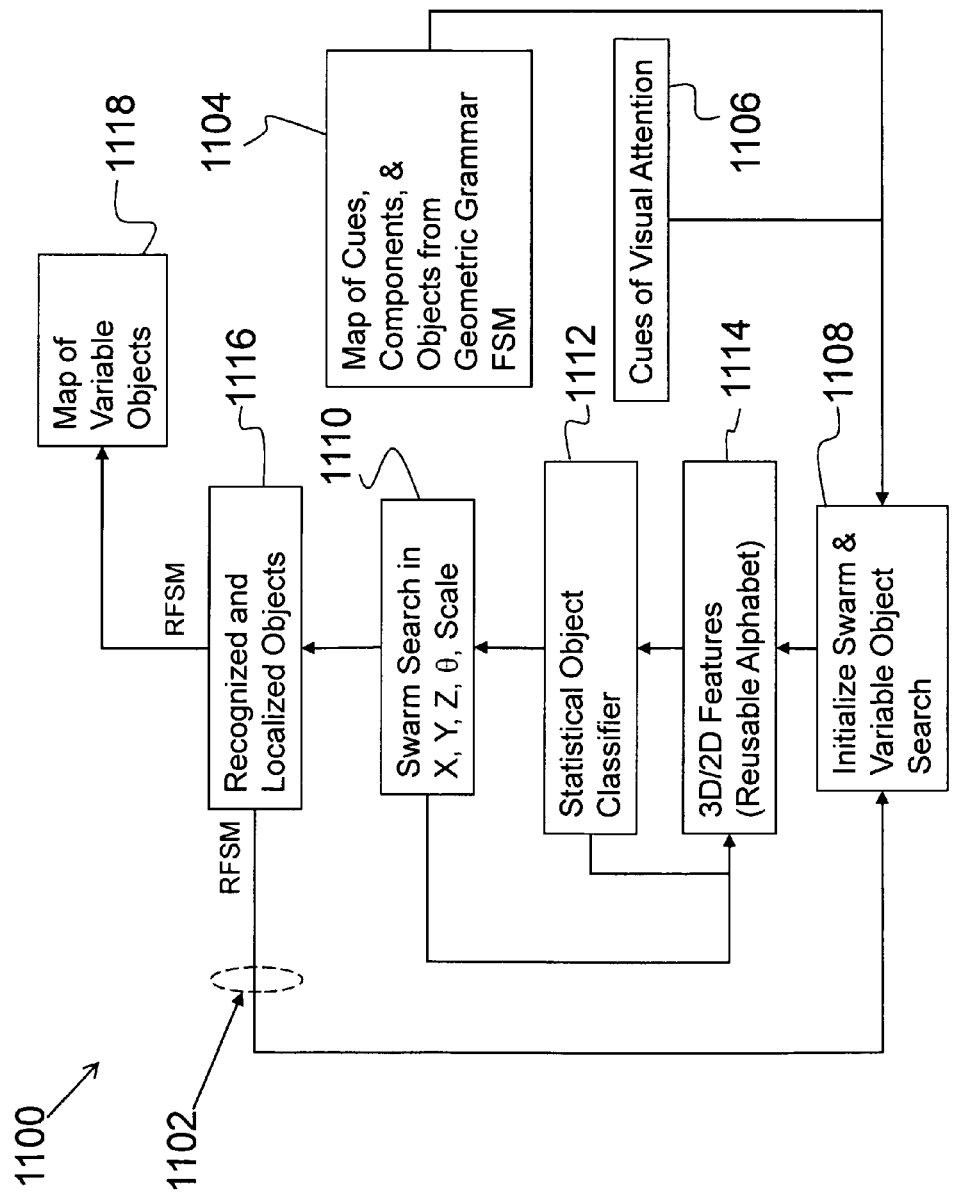
FIG. 11 is an illustration of the processing flow for non-geometric object recognition using statistical classifiers based on machine learning.

Details of the processing flow for geometric and variable object recognition are shown in FIGS. 10 and 11. FIG. 10 illustrates the processing flow 1000 for geometric object recognition. The processing flow is controlled 1002 by the Recognition Finite State Machine (RFSM). FIG. 5B is one example of an RFSM. FIG. 5B depicts the states and possible transitions involved in recognizing pole-like objects in the point cloud data. In contrast, FIG. 10 illustrates using many such RFSM's. Each one would correspond to either a cue (e.g., pole, wall, etc), or object components (e.g., pole with a light on top, adjacent walls, etc.), objects (e.g., lamppost, building, etc.), or composite objects (e.g., gas stations). The example for a cue RFSM is depicted in FIG. 5B. Once a pole segment is detected, the RFSM can be run for pole components and objects and detect if it is a lamppost. Similarly and referring again to FIG. 10, a hierarchy of RFSM's can be used to detect the different composite objects by recursively detecting the individual components.

The RFSM determines the next action based on the current result and position in a collection of RFSMs. The next action based on the current results and position is then determined by first choosing the relevant RFSM in the collection, determining the current state and the action. Object taxonomy is embedded in the RFSM action table, with a set of object-dependent RFSM actions that include recognizing the next object, moving to the next location, and changing the sampling resolution. The hierarchical nature of RFSM geometric object recognition is illustrated as the tokens 1004 generated by the RFSM grammars are assembled into cues 1006, the cues 1006 are assembled into object components 1008 or segments, the components 1008 are assembled into objects 1010, and the objects 1010 are assembled into composite objects 1012 consisting of object groups. An example of a composite object 1012 is a gas station which is composed of independent objects such as gas pumps, cars, and buildings.

FIG. 11 illustrates the processing flow for statistical object recognition 1100. The RFSM again determines 1102 the next action based on the current result and position in the semantic tree. Again, object taxonomy is embedded in the RFSM action table, with a set of object-dependent RFSM actions that include recognizing the next object, changing swarm search parameters, and changing sampling resolution. As shown in FIG. 11, cues from the geometric grammar FSM 1104 and from the visual attention block 1106 are used to initialize the cognitive swarm-based search mechanism 1108. The swarm searches 1110 in position, orientation, and scale for objects by maximizing the output confidence signal of the statistical object classifier 1112 which operates on features 1114 extracted from the point cloud. Once an object is recognized 1116 or the maximum number of swarm iterations is reached, the swarm is re-initialized 1108 on the next cue 1104 to search for additional objects, which are ultimately provided as a map of variable objects 1118.

What is claimed is:

1. A system for object recognition in colorized point clouds, comprising one or more processors that include:
    an implicit geometry engine, the implicit geometry engine configured to receive three-dimensional (3D) colorized point cloud data regarding a 3D object of interest, to convert the point cloud data into implicit representations, and to generate geometric features;
    a geometric grammar block, the geometric grammar block configured to generate object cues and recognize geometric objects using geometric tokens and finite state machines;
    a visual attention cueing block, the visual attention cueing block configured to generate object cues based on two-dimensional (2D) visually salient properties;
    an object recognition block, the object recognition block being configured to perform a local search for objects using cues from the cueing block and the geometric grammar block and to classify the 3D object of interest as a particular object upon a classifier reaching a predetermined threshold.

2. A system as set forth in claim 1, wherein the object recognition block further comprises:
    a search module, the search module configured to perform a local search for objects using cues from the visual attention cueing block and the geometric grammar block to generate candidate regions of interest (ROIs); and
    a statistical classifier block, the statistical classifier block being, configured to, within the candidate ROIs, implement multiple machine learning based object classifiers using geometric features generated by the implicit geometry engine, the statistical classifier block further configured to classify the 3D object of interest as a particular object upon the output of the object classifiers reaching a predetermined threshold.

3. A system as set forth in claim 2, wherein the implicit geometry engine is further configured to receive the 3D colorized point cloud data and process the 3D colorized point cloud data along separate 2D and 3D pathways, such that in the 3D pathway, the 3D colorized point cloud data is converted into implicit representations, while in the 2D pathway, color information in the 3D colorized cloud point data is projected into 2D representations for cueing and recognition of potential objects.

4. A system as set forth in claim 3, wherein the object recognition block is further configured to perform operations of:
    performing an object specific search of salient 2D (x, y) locations within the implicit representations to generate candidate ROIs;
    performing an object specific search of salient locations in (x,y) and altitude (z) if required for the 3D object of interest to generate candidate ROIs;
    applying object classifiers to classify the 3D object of interest as a particular object upon the output of the object classifiers reaching a predetermined threshold;
    determining if a spatial search is completed within the implicit representation so that there remains no unsearched portions of the implicit representation;
    if yes, determining if the 3D object of interest is the last object of interest in the implicit representations;
        if yes, then providing a user the classifications of the recognized objects and stopping;
        if no, then selecting a next object of interest within the implicit representations and repeating the process above beginning with performing an object specific search; and
    if no, then updating search parameters with the unsearched portions of the implicit representation and repeating the process above beginning with performing an object specific search.

5. A system as set forth in claim 4, wherein the search module is further configured to use particle swarm optimization to perform a local search for objects.

6. A system as set forth in claim 2, wherein the search module is further configured to use particle swarm optimization to perform a local search for objects.

7. A system as set forth in claim 1, wherein the implicit geometry engine is further configured to receive the 3D colorized point cloud data and process the 3D colorized point cloud data along separate 2D and 3D pathways, such that in the 3D pathway, the 3D colorized point cloud data is converted into implicit representations, while in the 2D pathway, color information in the 3D colorized cloud point, data is projected into 2D representations for cueing and recognition of potential objects.

8. A system as set forth in claim 1, wherein the object recognition block is further configured to perform operations of:
    performing an object specific search of salient 2D (x, y) locations within the implicit representations to generate candidate ROIs;
    performing an object specific search of salient locations in (x,y) and altitude (z) if required for the 3D object of interest to generate candidate ROIs;
    applying object classifiers to classify the 3D object of interest as a particular object upon the output of the object classifiers reaching a predetermined threshold;
    determining if a spatial search is completed within the implicit representation so that there remains no unsearched portions of the implicit representation;
        if yes, determining if the 3D object of interest is the last object of interest in the implicit representations;
            if yes, then providing a user the classifications of the recognized objects and stopping;
            if no, then selecting a next object of interest within the implicit representations and repeating the process above beginning with performing an object specific search; and
        if no, then updating search parameters with the unsearched portions of the implicit representation and repeating the process above beginning with performing an object specific search.

9. A computer implemented method for object recognition in colorized point clouds, comprising: an act of causing a computer having a processor to perform acts of:
    receiving, in an implicit geometry engine, a three-dimensional (3D) colorized point cloud data regarding a 3D object of interest, to convert the point cloud data into implicit representations, and to generate geometric features;
    generating, in a geometric grammar block, object cues and recognizing geometric objects using geometric tokens and finite state machines;
    generating, in a visual attention cueing block, object cues based on two-dimensional (2D) visually salient properties;
    performing, in an object recognition block, a local search for objects using cues from the cueing block and the geometric grammar block; and
    classifying the 3D object of interest as a particular object upon a classifier reaching a predetermined threshold.

10. The method as set forth in claim 9, further comprising acts of:
    performing, in a search module, a local search for objects using cues from the visual attention cueing block and the geometric grammar block to generate candidate regions of interest (ROIs); and
    implementing, in a statistical classifier block and within the candidate ROIs, multiple machine learning based object classifiers using, geometric features generated by the implicit geometry engine; and
    classifying the 3D object of interest as a particular object upon an output of the object classifiers reaching a predetermined threshold.

11. The method as set forth in claim 10, further comprising an act of receiving, in the implicit geometry engine, the 3D colorized point cloud data and processing the 3D colorized point cloud data along, separate 2D and 3D pathways, such that in the 3D pathway, the 3D colorized point cloud data is converted into implicit representations, while in the 2D pathway, color information in the 3D colorized cloud point, data is projected into 2D representations for cueing and recognition of potential objects.

12. The method as set forth in claim 11, limber comprising acts of:
    performing an object specific search of salient 2D (x, y) locations within the implicit representations to generate candidate ROIs;
    performing an object specific search of salient locations in (x,y) and altitude (z) if required for the 3D object of interest to generate candidate ROIs;
    applying object classifiers to classify the 3D object of interest as a particular object upon the output of the object classifiers reaching a predetermined threshold;
    determining if a spatial search is completed within the implicit representation so that there remains no unsearched portions of the implicit representation;
        if yes, determining if the 3D object of interest is the last object of interest in the implicit representations;
            if yes, then providing a user the classifications of the recognized objects and stopping;
            if no, then selecting a next object of interest within the implicit representations and repeating the process above beginning with performing an object specific search; and
        if no, then updating search parameters with the unsearched portions of the implicit representation and repeating the process above beginning with performing an object specific search.

13. The method as set forth in claim 12, further comprising an act of using, in the search module, particle swarm optimization to perform a local search for objects.

14. The method as set forth in claim 10, further comprising an act of using, in the search module, particle swarm optimization to perform a local search for objects.

15. The method as set forth in claim 9, further comprising an act of receiving, in the implicit geometry engine, the 3D colorized point cloud data and processing the 3D colorized point cloud data along separate 2D and 3D pathways, such that in the 3D pathway, the 3D colorized point d cloud data is converted into implicit representations, while in the 2D pathway, color information in the 3D colorized cloud point data is projected into 2D representations for cueing and recognition of potential objects.

16. The method as set forth in claim 9, further comprising acts of:
    performing an object specific search of salient 2D (x, y) locations within the implicit representations to generate candidate ROIs;
    performing, an object specific search of salient locations in (x, y) and altitude (z) if required for the 3D object of interest to generate candidate ROIs;
    applying object classifiers to classify the 3D object of interest as a particular object upon the output of the object classifiers reaching a predetermined threshold;
    determining if a spatial search is completed within the implicit representation so that there remains no unsearched portions of the implicit representation;
        if yes, determining if the 3D object of interest is the last object of interest the implicit representations;
            if yes, then providing a user the classifications of the recognized objects and stopping;
            if no, then selecting a next object of interest within the implicit representations and repeating the process above beginning with performing an object specific search; and if no, then updating search parameters with the unsearched portions of the implicit representation and repeating the process above beginning with performing an object specific search.

17. A computer program product for object recognition in colorized point clouds, the computer program product comprising computer-readable instruction means stored on a non-transitory computer-readable medium that are executable by a computer having a processor for causing, the processor to perform operations of:
   receiving, in an implicit geometry engine, a three-dimensional (3D) colorized cloud point data regarding a 3D object of interest, to convert the cloud point data into implicit representations, and to generate geometric features;
   generating, in a geometric grammar block, object cues and recognizing geometric objects using geometric tokens and finite state machines;
   generating, in a visual attention cueing block, object cues based on two-dimensional (2D) visually salient properties;
   performing, in an object recognition block, a local search for objects using cues from the cueing block and the geometric grammar block; and
   classifying the 3D object of interest as a particular object upon a classifier reaching a predetermined threshold.

18. The computer program product as set forth in claim 17, further comprising instruction means for causing the processor to perform operations of
   performing, in a search module, at local search for objects using cues from the visual attention cueing block and the geometric grammar block to generate candidate regions of interest (ROIs); and
   implementing, in a statistical classifier block and within the candidate ROIs, multiple machine learning based object classifiers using geometric: features generated by the implicit geometry engine; and
   classifying the 3D object of interest as a particular object upon an output of the object classifiers reaching a predetermined threshold.

19. The computer program product as set forth in claim 1$, further comprising instruction means for causing the processor to perform an operation of receiving, in the implicit geometry engine, the 3D colorized point cloud data and processing the 3D colorized point cloud data along separate 2D and 3D pathways, such that in the 3D pathway, the 3D colorized point cloud data is converted into implicit representations, while in the 2D pathway, color information in the 3D colorized cloud point data is projected into 2D representations for cueing and recognition of potential objects.

20. The computer program product as set forth in claim 19, further comprising instruction means for causing the processor to perform operations of:
   performing an object specific search of salient 2D (x, y) locations within the implicit representations to generate candidate ROIs;
   performing an object specific search of salient locations in (x, y) and altitude (z) if required for the 3D object of interest to generate candidate ROIs;
   applying object classifiers to classify the 3D object of interest as a particular object upon the output of the object classifiers reaching, a predetermined threshold;
   determining if a spatial search is completed within the implicit representation so that there remains no unsearched portions of the implicit representation;
   if yes, determining if the 3D object of interest is the last object of interest the implicit representations;
      if yes, then providing a user the classifications of the recognized objects and stopping;
      if no, then selecting a next object of interest within the implicit representations and repeating the process above beginning with performing an object specific search; and
   if no, then updating search parameters with the unsearched portions of the implicit representation and repeating the process above beginning with performing an object specific search.

21. The computer program product as set forth in claim 20, further comprising instruction means tier causing the processor to perform an operation of using, in the search module, particle swarm optimization to perform a local search for objects.

22. The computer program product as set forth in claim 18, further comprising instruction means for causing the processor to perform an operation of using, in the search module, particle swarm optimization to perform a local search for objects.

23. The computer program product as set forth in claim 17, further comprising instruction means for causing the processor to perform an operation of receiving, in the implicit geometry engine, the 3D colorized point cloud data and processing the 3D colorized point cloud data along separate 2D and 3D pathways, such that in the 3D pathway, the 3D colorized point cloud data is converted into implicit representations, while in the 2D pathway, color information in the 3D colorized point cloud data is projected into 2D representations for cueing and recognition of potential objects.

24. The computer program product as set forth in claim 17, further comprising instruction means for causing the processor to perform operations of:
   performing an object specific search of salient 2D (x, y) locations within the implicit representations to generate candidate ROIs;
   performing an object specific search of salient locations in (x, y) and altitude (z) if required for the 3D object of interest to generate candidate ROIs;
   applying object classifiers to classify the 3D object of interest as a particular object upon the output of the object classifiers reaching a predetermined threshold;
   determining if a spatial search is completed within the implicit representation so that there remains no unsearched portions of the implicit representation;
   if yes, determining if the 3D object of interest is the last object of interest in the implicit representations;
      if yes, then providing a user the classifications of the recognized objects and stopping;
      if no, then selecting a next object of interest within the implicit representations and repeating the process above beginning; with performing an object specific search; and
   if no, then updating search parameters with the unsearched portions of the implicit representation and repeating the process above beginning with performing an object specific search.

* * * * *